United States Patent [19]
Opheij et al.

[11] Patent Number: 5,712,841
[45] Date of Patent: Jan. 27, 1998

[54] OPTICAL UNIT HAVING A RADIATION SOURCE, A DETECTOR AND A GRATING, AND SCANNING DEVICE INCLUDING THE OPTICAL UNIT

[76] Inventors: Willem G. Opheij, Groenewoudseweg 1, 5621 BA Eindhoven; Pieter A. Schoneveld, Evreuxlaan 38, 5627 PV Eindhoven; Dirk B.J. Samoy, Groenewoudseweg 1, 5621 BA Eindhoven, all of Netherlands

[21] Appl. No.: 623,647

[22] Filed: Mar. 28, 1996

[30] Foreign Application Priority Data

Mar. 29, 1995 [EP] European Pat. Off. .............. 95200788

[51] Int. Cl.$^6$ ....................................................... G11B 7/00
[52] U.S. Cl. .................. 369/112; 369/44.12; 369/103; 369/109; 369/122
[58] Field of Search ........................... 369/112, 122, 369/103, 109, 44.12, 44.37, 44.23; 250/216, 201.5; 359/209, 572, 566

[56] References Cited

U.S. PATENT DOCUMENTS

| | | | |
|---|---|---|---|
| 5,029,255 | 7/1991 | Opheij et al. | 250/216 |
| 5,068,751 | 11/1991 | Braat et al. | 359/209 |
| 5,161,148 | 11/1992 | Hori et al. | 369/112 |
| 5,442,616 | 8/1995 | Ogata et al. | 369/112 |
| 5,446,719 | 8/1995 | Yoshida et al. | 369/112 |
| 5,566,157 | 10/1996 | Kojima et al. | 369/112 |

FOREIGN PATENT DOCUMENTS

| | | | |
|---|---|---|---|
| 0107461 A1 | 5/1984 | European Pat. Off. | G11B 7/00 |
| 0226647 A1 | 7/1987 | European Pat. Off. | G11B 7/08 |
| 0351953 A2 | 1/1990 | European Pat. Off. | |
| 3240734 A1 | 5/1983 | Germany. | |

*Primary Examiner*—David C. Nelms
*Assistant Examiner*—Kim-kwok Chu
*Attorney, Agent, or Firm*—Michael E. Belk

[57] ABSTRACT

An optical unit includes a first holder with a radiation source, a second holder with a radiation-sensitive detector, a grating, and a mirror. The unit further includes a cylindrical mounting having a cylinder axis and a wall oriented transversely to the cylinder axis, the grating and the mirror being formed by optically transparent wall portions of the wall. The mounting has a first positioning surface to which the first holder with the radiation source is secured and a second positioning surface to which the second holder with the radiation-sensitive detector is secured.

23 Claims, 2 Drawing Sheets

OPTICAL UNIT HAVING A RADIATION SOURCE, A DETECTOR AND A GRATING, AND SCANNING DEVICE INCLUDING THE OPTICAL UNIT

BACKGROUND OF THE INVENTION

The invention relates to an optical unit comprising a first holder with a radiation source, a second holder with a radiation-sensitive detector, and a grating.

The invention further relates to an optical scanning device for scanning an information surface, which scanning device includes an optical unit.

Such a unit is known from EP-A 0,107,461, which describes the optical unit as part of an optical scanning device. The known scanning device has an optical path including a semiconductor laser, a diffraction grating, an objective, a beam splitter, mirrors and a light-sensitive detector. The scanning device comprises a holder carrying the laser, a lens and an actuator for a rotatable mirror, and further comprises an alignment holder carrying the diffraction grating. Both holders as well as the beam splitter, the detector, a focusing actuator and a shutter are mounted on a base. A disadvantage of the known scanning device and, consequently, of the known optical unit is that the various optical components have to be aligned and mounted separately. As a result, the production process is comparatively laborious. Moreover, the resulting product is comparatively bulky.

SUMMARY OF THE INVENTION

It is an object of the invention to improve the optical unit of the type defined in the opening paragraph in such a manner that a compact unit is obtained, whilst a maximum freedom as regards the choice of the radiation source and the radiation-sensitive detector is maintained.

The optical unit in accordance with the invention is characterized by the presence of a cylindrical mounting having a cylinder axis and a wall oriented at least approximately transversely of the cylinder axis, the grating being formed by an optically transparent wall portion of said wall and the mounting having a first positioning surface to which the first holder with the radiation source is secured and a second positioning surface to which the second holder with the radiation-sensitive detector is secured. By integrating the grating in a housing which also carries the radiation source and the detector it is possible to obtain a simple and easy-to-manufacture mechanically stable unit of limited dimensions. Since the holder with the radiation source and the holder with the detector are separate components one component can be selected independently of the other component. Moreover, the unit in accordance with the invention makes it possible to use regular commercially available radiation source units comprising a radiation source accommodated in a protective holder, particularly a semiconductor laser, and detector systems comprising a radiation-sensitive detector mounted on a holder. During manufacture of the optical unit in accordance with the invention the holder with the radiation source is preferably first secured to the first positioning surface, for example by means of an adhesive, the positioning surface ensuring that the radiation source is correctly aligned, after which the holder with the detector is placed against the second positioning surface and, after alignment by moving it over the positioning surface, is secured to the second positioning surface, for example also by means of an adhesive.

The optical unit in accordance with the invention can be used in optical devices for scanning optical record carriers, scanning being understood to mean scanning both for the purpose of recording and for the purpose of reading information. The information surface may be a layer already inscribed or a layer to be provided partly or wholly with information. Apart from this, the optical unit may also be used in optical devices in general.

It is to be noted that EP-A 0,226,647 discloses a write/read head for optical discs, which comprises a disc-shaped transparent substrate having a surface carrying integrated optical elements for shaping and controlling light beams. A laser and a detector may be mounted in a recess in a substrate surface or they may be accommodated in a common housing secured to the substrate surface.

An embodiment of the optical unit in accordance with the invention comprising a mirror, is characterized in that the mirror is formed by an optically transparent further wall portion of the wall which is oriented transversely of the cylinder axis, and in that the first positioning surface extends transversely of the cylinder axis of the mounting, the radiation source being situated in a space inside the mounting, and the second positioning surface extends parallel to the cylinder axis, the detector being situated outside the mounting. In this practical unit the optical components are in a very compact arrangement, which manifests itself particularly in the limited axial dimension of the optical unit.

An embodiment of the optical unit in accordance with the invention is characterized in that the grating is a separating grating formed in a surface of the wall which is oriented transversely of the cylinder axis, which surface is remote from the radiation source and extends transversely of the cylinder axis. The separating grating can serve to diffract a part of a radiation beam reflected from an information surface to the radiation-sensitive detector.

An embodiment of the optical unit in accordance with the invention is characterized in that the mirror is a surface of the wall which is oriented transversely of the cylinder axis, which surface faces the radiation source and is inclined relative to the cylinder axis. This mirror can be arranged in the path of a sub-beam formed by a diffraction grating to direct this sub-beam to the radiation-sensitive detector. The integrated mirror is preferably internally reflecting, which allows a reflecting layer to be dispensed with.

An embodiment of the optical unit in accordance with the invention is characterized in that an optically transparent wall portion of the mounting, which wall portion faces the detector, forms an exit window.

An embodiment of the optical unit in accordance with the invention is characterized by the presence of a multi-beam grating, which is formed in a surface of the wall which is oriented transversely of the cylinder axis, which surface faces the radiation source and extends transversely of the cylinder axis. The multi-beam grating is preferably a three-beam grating for deriving two sub-beams from a radiation-beam issuing from the radiation source. During scanning of an information surface these two sub-beams can produce two auxiliary spots at either side of a scanning spot. The reflected radiation of these auxiliary spots can be detected in the radiation-sensitive detector in order to generate tracking-error signals.

An embodiment of the optical unit in accordance with the invention is characterized in that the mounting is an injection-molded product. It has been found that injection-molding is a very suitable method of manufacturing the mounting provided with at least an integrated grating and, if required, an integrated mirror in one production step using suitable dies. To form a grating an appropriate die section should have a suitable embossed surface and to form a minor or an exit window an appropriate die section should have a perfectly smooth surface. Suitable transparent synthetic materials are, for example, polycarbonate and polymethyl methacrylate. The optical unit may be injection-molded from two different materials, inter alia in view of the dissipation of heat from the radiation source and/or the detector, an optically transparent material being used at the locations where a beam should pass through. At other locations the emphasis is on materials with a suitable thermal conductivity, such as a carbon-filled plastics, for example a liquid crystal polymer.

An embodiment of the optical unit in accordance with the invention is characterized in that of the wall which is oriented transversely of the cylinder axis the surface which is remote from the radiation source and/or the surface which faces the radiation source are/is curved. As a result of this step the optical unit also has an integrated beam shaper, which can be used to change the cross-sectional shape of a radiation beam which is incident on the beam shaper.

It is a further object of the invention to provide a compact optical scanning device for optically scanning an information surface.

To this end the scanning device in accordance with the invention comprises an optical unit in accordance with the invention and further comprising an objective system for focusing the radiation beam produced by the optical unit so as to form a scanning spot on the information surface and for directing the radiation beam back to the optical unit after reflection from the information surface. Owing to the use of the optical unit in accordance with the invention the scanning device can be assembled simply.

BRIEF DESCRIPTION OF THE DRAWINGS

The invention will now be described in more detail, by way of example, with reference to the drawings, in which.

DESCRIPTION OF THE PREFERRED EMBODIMENTS

Figure 1:
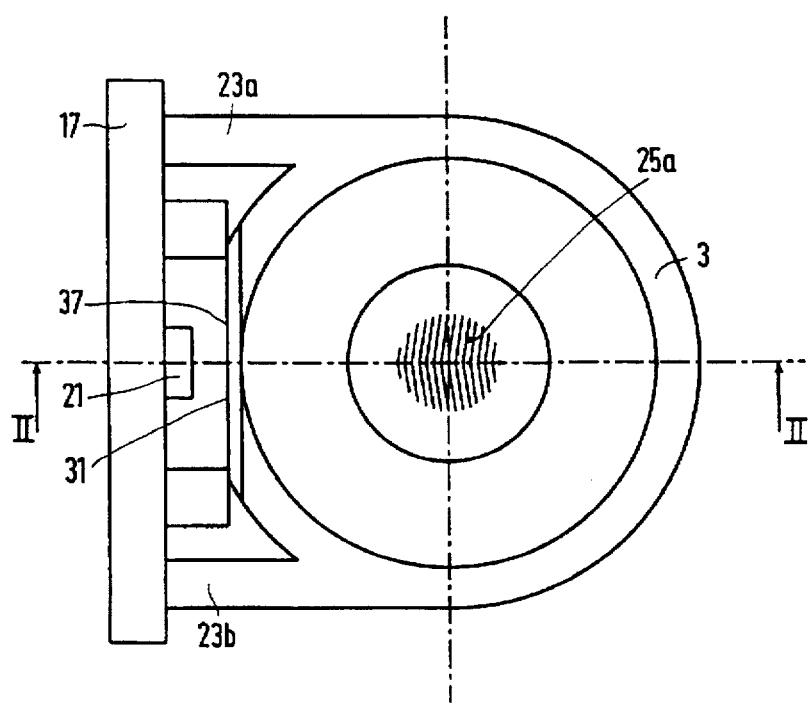
FIG. 1 is a plan view showing a first embodiment of the optical unit in accordance with the invention.
Figure 2:
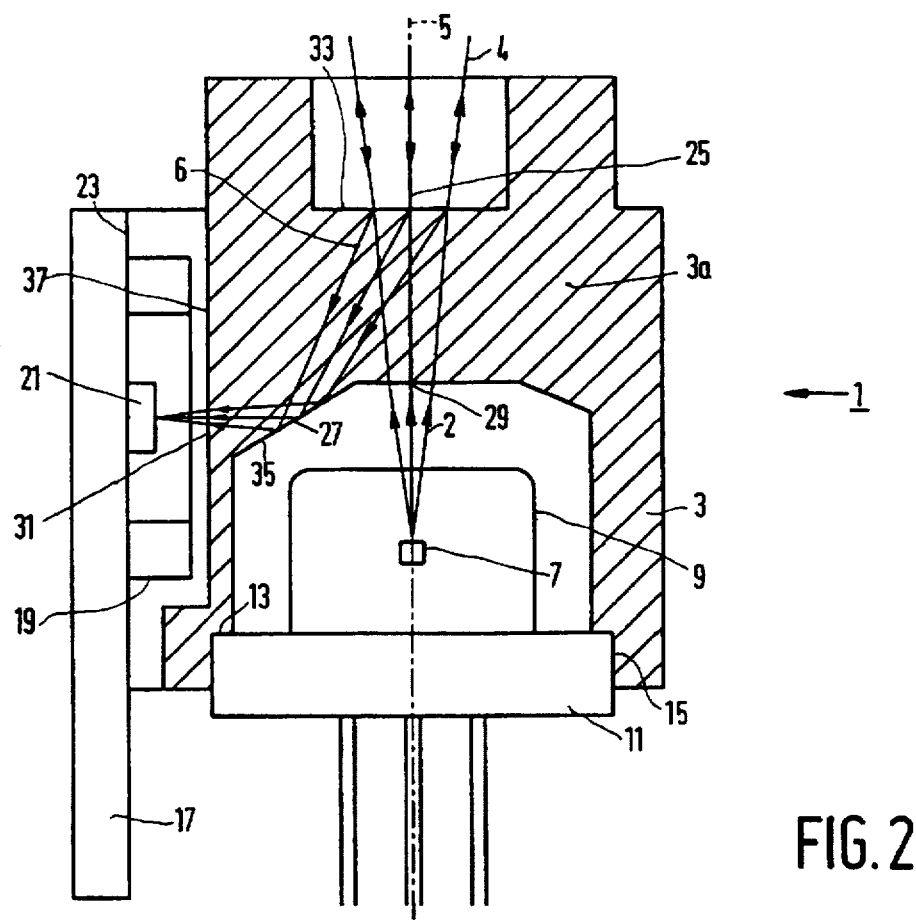
FIG. 2 is a sectional view II-II of the embodiment shown in FIG. 1.

The optical unit 1 in accordance with the invention shown in FIGS. 1 and 2 comprises a cylindrical mounting 3 having a cylinder axis 5 and a wall 3a oriented transversely of the cylinder axis 5. Alternatively the wall 3a may be oriented mainly or approximately transversely of the cylinder axis 5. It is to be noted that a cylindrical mounting is to be understood to mean an elongate mounting of circular cross-section or of non-circular cross-section, for example elliptical cross-section or rectangular cross-section. The mounting 3 is manufactured from a transparent plastics, in the present example polycarbonate, by injection-molding. The optical unit 1 comprises a radiation source 7, in the form of a diode laser, for generating a radiation beam 2, the radiation source 7, which is accommodated in a protective housing 9, being mounted on a first holder 11. The holder 11 is secured to a first positioning surface 13 of the mounting 3, which positioning surface extends transversely of the cylinder axis 5. The mounting 3 preferably comprises such an abutment 15 for cooperation with the holder 11 that after the holder 11 has been secured to the mounting 3, for example by gluing or clamping, the optical axis of the laser 7 coincides with the cylinder axis 5 of the mounting 3. The optical unit 1 further comprises a detector 21 which is mounted on a second holder 17 and protected by a housing 19. The holder 17 is secured to a second positioning surface 23, which extends parallel to the cylinder axis 5 and in the present example is formed by two limbs 23a and 23b of the mounting 3. The holder 17 can be secured to the mounting 3 by means of an adhesive, screws or by another fixing method.

In addition to the separate optical components 7 and 21 secured to the mounting 3 the optical unit in accordance with the invention comprises components which are integrated in the mounting 3. In the present example these components are a separating grating 25, a mirror 27, a three-beam grating 29 and an exit window 31. The separating grating 25 is formed by an optically transparent wall portion and is situated in a surface 33 of the optically transparent wall 3a, which surface is remote from the radiation source 7. The separating grating 25 has a suitable pattern of grating lines 25a and serves to diffract a part of an incident beam 4 as a sub-beam 6 to the detector 21. The sub-beam 6 is directed to the detector 21 via the mirror 27 and the exit window 31. The mirror 27 is formed by an inclined smooth surface 35 of the wall 3a, which surface faces the radiation source 7. The sub-beam 6 has such an angle of incidence on the mirror 27 and the transparent material of the wall 3a has such a refractive index that the mirror 27 is totally internally reflecting. The exit window 31 is formed by an optically transparent flat wall portion 37 of the mounting 3, which wall portion faces the detector 31.

Figure 3:
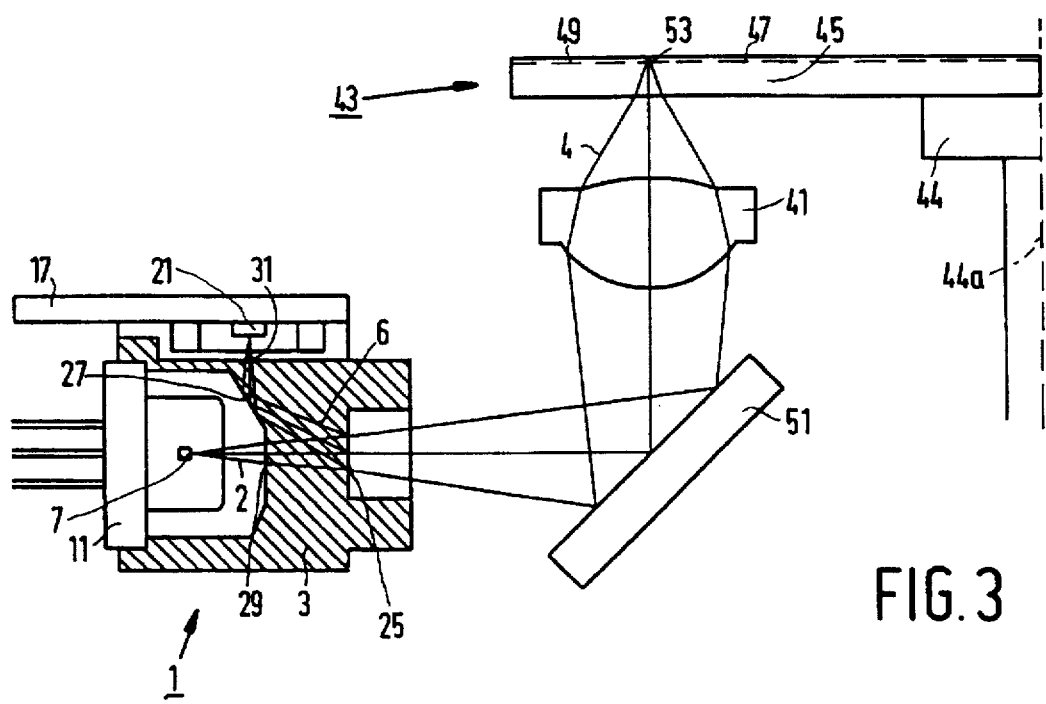
FIG. 3 shows diagrammatically a first embodiment of the optical scanning device in accordance with the invention, which includes the first embodiment of the optical unit in accordance with the invention.

The optical scanning device in accordance with the invention shown in FIG. 3 comprises an optical unit 1 as described above and an objective system 41. The scanning device is suitable for optically scanning an optical record carrier 43, particularly a disc-shaped record carrier situated on a turntable 44 of the scanning device, which turntable is rotatable about an axis of rotation 44a. The record carrier 43 comprises a transparent substrate 45, a reflecting information surface 47, and a protective coating 49. The information surface has tracks which contain or can be provided with information in the form of information areas which are optically distinct from their environment. The optical unit 1 comprises a first holder 11 with a radiation source 7, which in operation produces a beam 2 of preferably circular cross-sectional shape. The beam 2 is incident on a three-beam grating 29, which is an integrated part of an optically transparent wall 3a of a mounting 3. The grating 29 produces two sub-beams, not shown. The grating 29 has substantially straight parallel grating lines. The beam 2 and said sub-beams reach the objective system 41 via a folding mirror 51. This objective system forms a scanning spot 53 and two auxiliary spots at opposite sides of the scanning spot on the information surface 47. Information tracks can be scanned by moving the information surface 47 and the scanning device relative to one another, particularly by rotating the record carrier 43 about the axis of rotation 44a and by radially moving the scanning spot 53, particularly by moving the objective system 41. The information surface 47 reflects the radiation as a return beam 4, which reaches a separating grating 25 via the objective system 41 and the folding mirror 51. The separating grating 25 is an integrated part of the mounting 3 of the optical unit 1. The separating grating 25 diffracts a part of the return beam 4 to a detector 21 as a sub-beam 6. The sub-beam 6 reaches the detector 21, which is secured to the mounting 3 by means of a holder 17, via a mirror 27 and an exit window 31 which are integrated in the mounting 3. The reflected beam is modulated in accordance with the information stored in the information surface. The detector 21 converts this modulation into electric signals. The detector may comprise a plurality of detector units, so that a number of output signals can be obtained which are processed in a signal processing circuit, to form an information signal, a tracking-error signal and a focus-error signal.

The two last-mentioned signals are applied to a tracking servo-system and a focus servo-system. As a result of the use of the three-beam grating 29 the tracking signal is a tracking signal in accordance with the so-called three-beam method. However, the scanning device in accordance with the invention can also be constructed without a three-beam grating. The separating grating 25 may have different shapes depending on the configuration of the detector units in the detector 21 and the manner in which signals are derived from the output signals of the detector.

Figure 4:
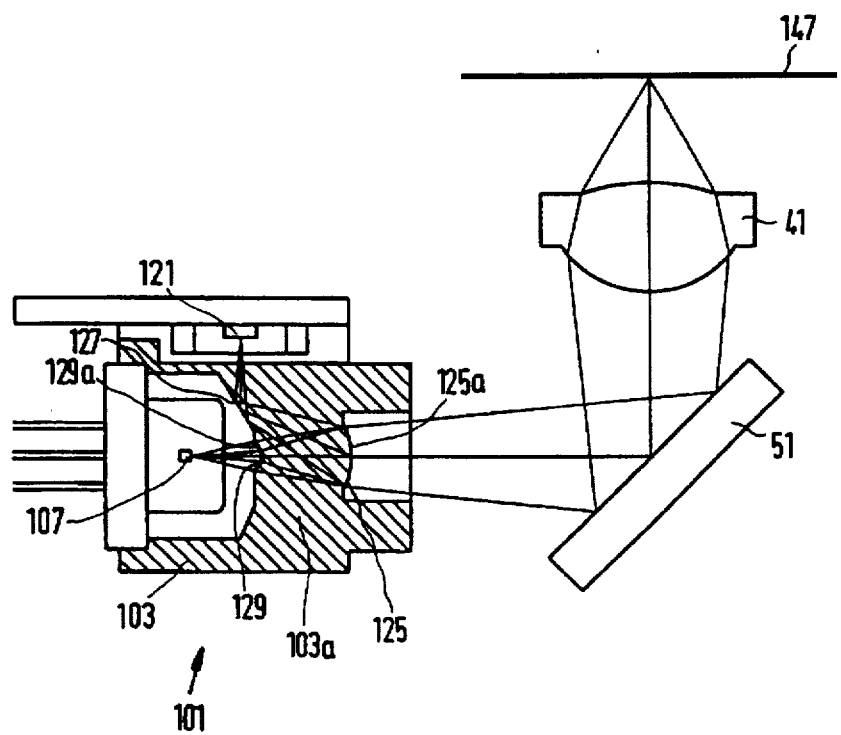
FIG. 4 shows a second embodiment of the optical unit used in a scanning device.

The scanning device in accordance with the invention shown in FIG. 4 comprises an optical unit 101 in accordance with the invention and further includes a folding mirror 51 and an objective system 41 for the formation of a scanning spot on an information surface 147. The optical unit 101 comprises a radiation source 107 and a detector 121, which correspond to the radiation source 7 and the detector 21, respectively, of the scanning device shown in FIG. 3. The unit 101 further comprises an optically transparent cylindrical mounting 103 with an integrated plane mirror 127 and two gratings which are integrated with an optically transparent wall 103a, i.e. a three-beam grating 129 in a concave, particularly a cylindrical surface 129a and a separating grating 125 in a convex, particularly a toroidal surface 125a. As a result, the wall 103a, which forms part of the mounting 3, also functions as a beam shaper.

We claim:

1. An optical unit comprising a first holder with a radiation source, a second holder with a radiation-sensitive detector, and a grating, characterized by the presence of a cylindrical, optically transparent mounting having a cylinder axis and a wall oriented at least approximately transversely of the cylinder axis, the grating being formed by an optically transparent wall portion of said wall and the mounting having a first positioning surface to which the first holder with the radiation source is secured and a second positioning surface to which the second holder with the radiation-sensitive detector is secured.

2. An optical unit as claimed in claim 1, and further comprising an objective system for focusing the radiation beam produced by the optical unit so as to form a scanning spot on an information surface and for directing the radiation beam back to the optical unit after reflection from the information surface.

3. An optical unit as claimed in claim 1, characterized in that the grating is a separating grating formed in a surface of the wall which is oriented transversely of the cylinder axis, which surface is remote from the radiation source and extends transversely of the cylinder axis.

4. An optical unit as claimed in claim 3, characterized in that of the wall which is oriented transversely of the cylinder axis which is remote from the radiation source and/or the surface which faces the radiation source are/is curved.

5. An optical unit as claimed in claim 1, characterized by the presence of a multi-beam grating, which is formed in a surface of the wall which is oriented transversely of the cylinder axis, which surface faces the radiation source and extends transversely of the cylinder axis.

6. An optical unit as claimed in claim 5, characterized in that of the wall which is oriented transversely of the cylinder axis which is remote from the radiation source and/or the surface which faces the radiation source are/is curved.

7. An optical unit as claimed in claim 5, and further comprising an objective system for focusing the radiation beam produced by the optical unit so as to form a scanning spot on the information surface and for directing the radiation beam back to the optical unit after reflection from the information surface.

8. An optical unit comprising a first holder with a radiation source, a second holder with a radiation-sensitive detector, and a grating, characterized by the presence of a cylindrical mounting having a cylinder axis and a wall oriented at least approximately transversely of the cylinder axis, the grating being formed by an optically transparent wall portion of said wall and the mounting having a first positioning surface to which the first holder with the radiation source is secured, a second positioning surface to which the second holder with the radiation-sensitive detector is secured, and the mounting is an injection-molded product.

9. An optical unit comprising a first holder with a radiation source, a second holder with a radiation-sensitive detector, a grating, and a mirror, characterized by the presence of a cylindrical mounting having a cylinder axis and a wall oriented at least approximately transversely of the cylinder axis, the grating being formed by an optically transparent wall portion of said wall and the mounting having a first positioning surface to which the first holder with the radiation source is secured and a second positioning surface to which the second holder with the radiation-sensitive detector is secured, and characterized in that the mirror is formed by an optically transparent further wall portion of the wall which is oriented transversely of the cylinder axis, and in that the first positioning surface extends transversely of the cylinder axis of the mounting, the radiation source being situated in a space inside the mounting, and the second positioning surface extends parallel to the cylinder axis, the detector being situation outside the mounting.

10. An optical unit as claimed in claim 9, characterized in that the grating is a separating grating formed in a surface of the wall which is oriented transversely of the cylinder axis, which surface is remote from the radiation source and extends transversely of the cylinder axis.

11. An optical unit as claimed in claim 10, characterized in that the mirror is a surface of the wall which is oriented transversely of the cylinder axis, which surface faces away from the radiation source and is inclined relative to the cylinder axis.

12. An optical unit as claimed in claim 9, characterized in that an optically transparent wall portion of the mounting, which wall portion faces the detector, forms an exit window.

13. An optical unit as claimed in claim 9, characterized by the presence of a multi-beam grating, which is formed in a surface of the wall which is oriented transversely of the cylinder axis, which surface faces the radiation source and extends transversely of the cylinder axis.

14. An optical unit as claimed in claim 9, characterized in that the mirror is a surface of the wall which is oriented transversely of the cylinder axis, which surface faces away from the radiation source and is inclined relative to the cylinder axis.

15. An optical unit as claimed in claim 9, and further comprising an objective system for focusing the radiation beam produced by the optical unit so as to form a scanning spot on the information surface and for directing the radiation beam back to the optical unit after reflection from the information surface.

16. An optical unit as claimed in claim 9, characterized in that the mounting is an injection-molded product.

17. An optical unit comprising a first holder with a radiation source, a second holder with a radiation-sensitive detector, and a grating, characterized by the presence of a cylindrical mounting having a cylinder axis and a wall oriented at least approximately transversely of the cylinder axis, the grating being formed by an optically transparent wall portion of said wall and the mounting having a first positioning surface to which the first holder with the radiation source is secured, a second positioning surface to which the second holder with the radiation-sensitive detector is secured, and an optically transparent wall portion of the mounting, which wall portion faces the detector, forms an exit window.

18. An optical unit as claimed in claim 5, characterized by the presence of a multi-beam grating, which is formed in a surface of the wall which is oriented transversely of the cylinder axis, which surface faces the radiation source and extends transversely of the cylinder axis.

19. An optical unit as claimed in claim 17, characterized in that the mounting is an injection-molded product.

20. An optical unit as claimed in claim 17, and further comprising an objective system for focusing the radiation beam produced by the optical unit so as to form a scanning spot on the information surface and for directing the radiation beam back to the optical unit after reflection from the information surface.

21. An optical unit, comprising a first holder with a radiation source, a second holder with a radiation-sensitive detector, and a grating, characterized by the presence of a cylindrical mounting having a cylinder axis and a wall oriented at least approximately transversely of the cylinder axis, the grating being formed by an optically transparent wall portion of said wall and the mounting having a first positioning surface to which the first holder with the radiation source is secured and a second positioning surface to which the second holder with the radiation-sensitive detector is secured, a multi-beam grating, which is formed in a surface of the wall which is oriented transversely of the cylinder axis, which surface faces the radiation source and extends transversely of the cylinder axis, and the mounting is an injection-molded product.

22. An optical unit comprising a first holder with a radiation source, a second holder with a radiation-sensitive detector, and a grating, characterized by the presence of a single piece, cylindrical mounting having a cylinder axis and a wall oriented at least approximately transversely of the cylinder axis, the grating being formed by an optically transparent wall portion of said wall and the mounting having a first positioning surface to which the first holder with the radiation source is secured and a second positioning surface to which the second holder with the radiation-sensitive detector is secured.

23. An optical unit comprising a first holder with a radiation source, a second holder with a radiation-sensitive detector, and a grating, characterized by the presence of a cylindrical mounting having a cylinder axis and a wall oriented at least approximately transversely of the cylinder axis, the grating being formed by an optically transparent wall portion of said wall and the mounting having a first positioning surface to which the first holder with the radiation source is secured, a second positioning surface to which the second holder with the radiation-sensitive detector is secured and a radiation path of radiation detected by the detector and output by the source passing through the mounting.

* * * * *